Sept. 4, 1934.   S. MORSE   1,972,242
METHOD OF OPERATING AERIAL VEHICLES
Filed Jan. 28, 1931   2 Sheets-Sheet 1
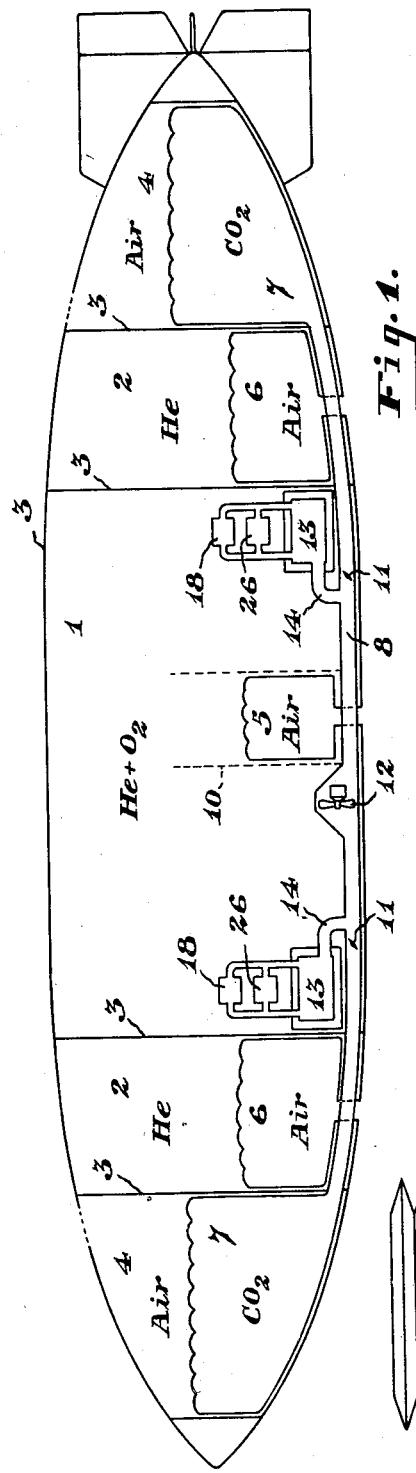
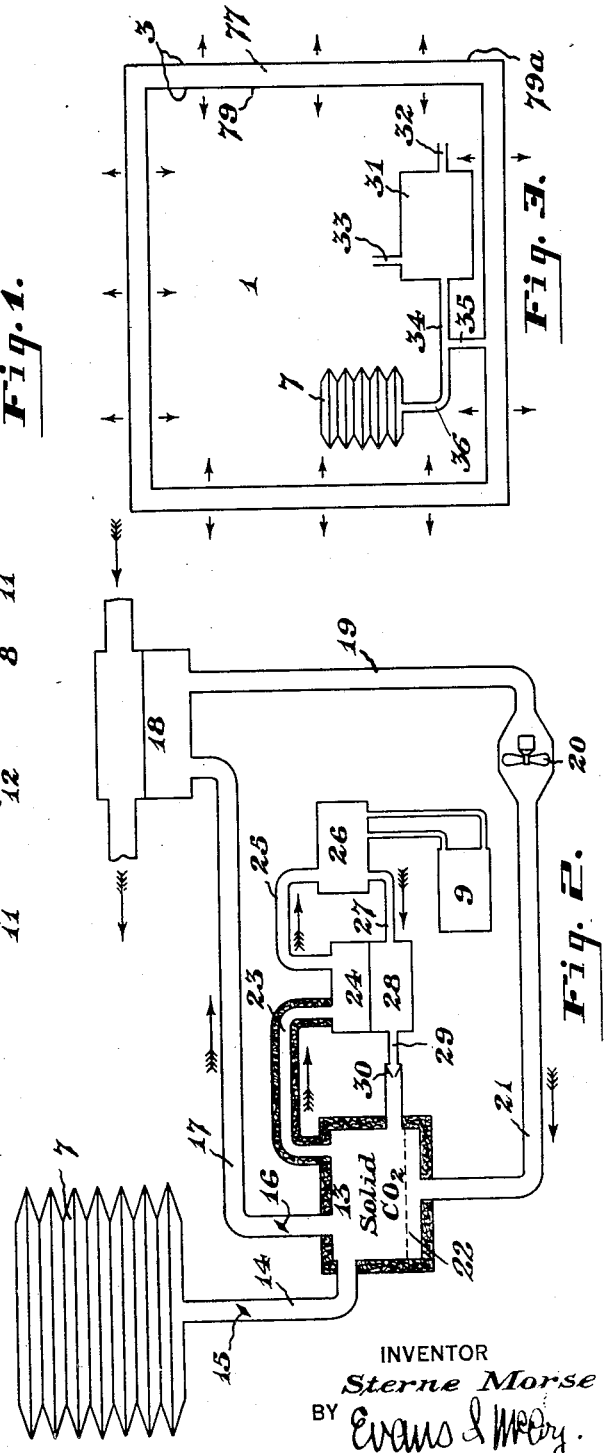
INVENTOR
Sterne Morse
BY Evans & Mcery
ATTORNEYS Sept. 4, 1934.     S. MORSE     1,972,242
METHOD OF OPERATING AERIAL VEHICLES
Filed Jan. 28, 1931     2 Sheets-Sheet 2
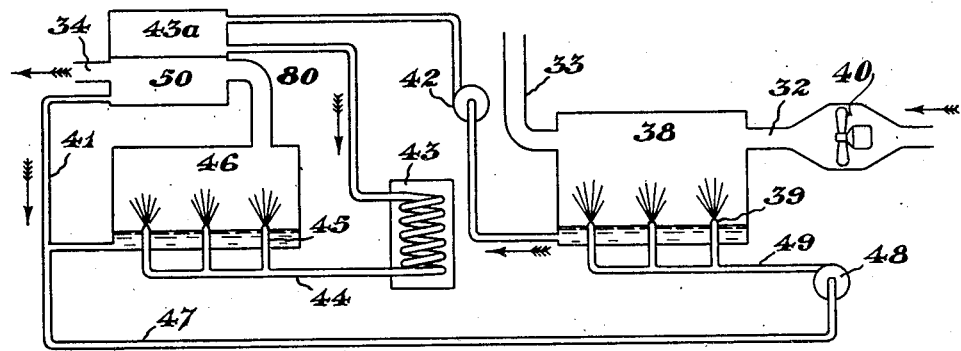
Fig. 4.
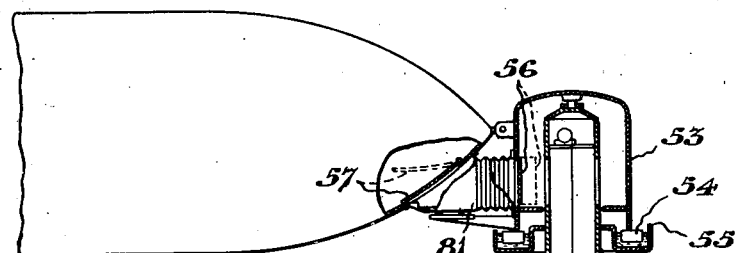
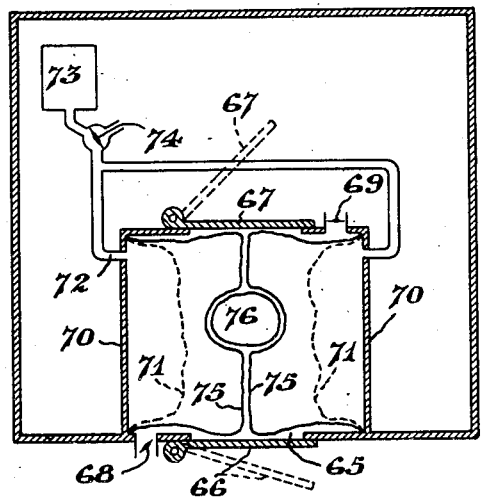
Fig. 6.
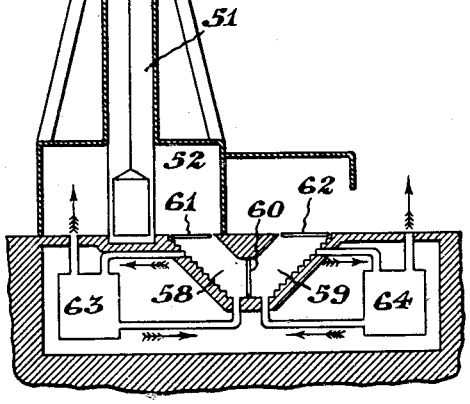
Fig. 5.
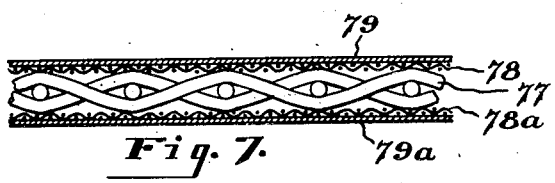
Fig. 7.
INVENTOR
Sterne Morse
BY Evans & McCoy
ATTORNEYS Patented Sept. 4, 1934

1,972,242

UNITED STATES PATENT OFFICE 1,972,242

METHOD OF OPERATING AERIAL VEHICLES

Sterne Morse, Richmond Heights, Ohio

Application January 28, 1931, Serial No. 511,748

18 Claims. (Cl. 244—3)

This invention has to do with a method of operation for vehicles traveling in the air. Its greatest field lies with those that are approximately the same weight as the air they displace, such as rigid airships of the Zeppelin type. It may have application to vehicles of a type hybrid between those and airplanes proper, as will later be described.

The primary object of this invention is to utilize the space commonly given up in airships of the lighter than air class to the carrying of passengers, crew, freight, motors and the like for buoyant purposes, and, conversely, to add to this useful space that part of the volume of the ship now used for buoyant purposes, or a large part of it.

Another object is the provision of a mixture of a buoyant, chemically inactive gas, such as helium, with oxygen to produce a buoyant gas mixture which is respirable and which will support life.

Another object is the provision of living, operating and freight space in an aerial vehicle which is hermetically sealed and which is filled with a gas mixture which is both buoyant and respirable.

Another object is to replace the space which is used in vehicles lighter than air for buoyancy purposes only, wholly or partly by space which has, on the one hand, the purpose of affording or assisting in buoyancy and in providing, on the one hand, living quarters for crew and passengers, on the other hand space for motors and other machinery and for freight.

Another object is to provide a method of trimming and adjusting buoyancy which will not involve the loss of ballast or buoyant gas in any ordinary case.

Another object is the provision of means for removing from such a confined body of helium and oxygen the carbon dioxide developed as a result of respiration or other combustion, such means being regenerated.

Another object is the provision of means whereby leakage of valuable gas from the aerostat is largely prevented.

Another object is the provision of means whereby airships of the type outlined herein may be conveniently docked, entered, loaded, etc., without loss of valuable gas, by the provision of simple and convenient types of gas-lock.

A principle concerning mixtures of gases which do not react with one another is that each gas reacts physically and chemically as though it alone were present. For example, the pressure of a mixture of helium and oxygen in a space is the sum of the pressure which that amount of helium would exert in that space, if pure, and that pressure which the oxygen, if pure, would similarly exert, and these pressures, commonly called partial pressures, bear that proportion to the respective numbers of molecules of the two types of gas present which the total number bears to the total pressure.

The atmosphere which we breathe contains about 21% by weight of oxygen, corresponding to a partial pressure of about 145 mm. of mercury when the total pressure is 760 mm. The other constitutents, except for carbon dioxide and water vapor, are nitrogen and argon and the other "noble" gases, all of them relatively or completely inactive chemically. The carbon dioxide in fresh air exists in so small an amount that it can be neglected, as can, for our purposes, the water vapor. In the case, therefore, of chemical indifference of the other constituents, the respirability of a given gas mixture depends solely on the absolute amount of oxygen present; in other words, on the numerical amount of its partial pressure in the mixture. We can live without realizing the difference if the atmosphere is pure oxygen at a pressure corresponding to its partial pressure in an ordinary atmosphere. And, in fact, this pressure can be sensibly decreased without greatly affecting the ease of living, as no great difficulty is encountered in living at altitudes where the total pressure has dropped to 500 mm., or less, and the partial pressure of the oxygen to 100 mm., or less. And, in particular, the nitrogen may be substituted by another indifferent gas without the person realizing the change, except in some such physical way as the increased heat conductivity of the latter gas over nitrogen.

A mixture of helium and oxygen in which the partial pressure of oxygen is 100 mm. of mercury will, therefore, not only support respiration, but will permit useful work to be carried on within it. Such a mixture is buoyant, having an average molecular weight of about 7.68, and will have a lift of about 73% of that exerted by a complete vacuum where pure helium would have a molecular weight of 4.00, and 86.6%, and hydrogen 2.01, and 93.2%. Air has an average molecular weight of about 29. The densities of gases at the same pressure are proportionate to their average molecular weight.

Putting it another way, a person weighing 150 lbs. would require about 2500 cu. ft. of such a mixture to support his weight, and this space compares fairly well with that assigned to first class passengers in the average steamship.

Air weighs about .075 lbs. per cu. ft. at 68° and standard pressure, and such a mixture of helium and oxygen weighs about .020 lbs.; a cubic foot, therefore, will support .055 lbs. of fabric and load.

It accordingly follows that if the passenger space in a vehicle lighter than air be provided with an atmosphere of such a character this space then becomes largely or wholly self-supporting, as is also the case with the crew and machinery spaces. It becomes then possible to increase greatly the amount of passenger space with respect to the other elements of the airship, as it no longer represents dead weight to be supported. For this reason it follows that an airship of a given size is in this way rendered capable of carrying a greatly increased pay load, quite enough to convert this method of passenger transportation from one which is so expensive as to be hardly economically feasible to one which may be possibly the cheapest method of passenger transportation, and, at any rate, able to compete successfully with other high class methods.

Under certain circumstances all the buoyant space will be of this character, with the consequent full utilization of the space within for the double purpose. This, in general, will be the case where the ship is to be used at relatively low altitudes, as, for example, when it is to make voyages across water. When this is the case, the proportion of oxygen in the mixture will be small, and the amount of space per passenger also comparatively small. Under these conditions it will be necessary to have all the buoyant space filled with helium oxygen mixture in order that the consumption of oxygen during the trip will not decrease the partial pressure of oxygen to a point where discomfort is felt by crew and passengers.

However, where it is necessary to rise to high altitudes, as, for example, during a voyage across the continent, it will be necessary, in the first place, to assign a greater volume of buoyant gas per passenger on account of the decreased lift at high altitudes and also to start at sea level with a higher proportion of oxygen in the atmosphere which is to support respiration. Under these conditions an unnecessarily large amount of oxygen would be carried if the whole buoyant space within the ship were filled with an oxygen helium mixture. While oxygen carried in this way does not itself result in appreciable load on the ship, the extra structure necessary to contain it does. It is accordingly desirable to carry no more than is necessary to prevent undue decrease of its partial pressure during a trip, and it will be wise to have a certain proportion of the buoyant space filled with pure helium.

Example may be given of the relationships involved. If a ship starts at sea level, the temperature being 20° C. and ascends to 1000 feet, the air displaced will weigh only 3.6% less at this altitude than at sea level, and the pressure will only decrease in like proportion. If air-filled ballonets are used the decreased lift per unit of volume of buoyant gas is exactly compensated for by the increased volume and the lift remains unchanged. If the partial pressure of oxygen in the buoyant atmosphere were 100 mm. of mercury at sea level it would be 96.4 mm. at this level. This decrease would not be important. If, on the other hand, it is necessary to rise to 10,000 feet altitude, as might be necessary to cross the continental divide at certain points, the pressure would diminish 31%, with the same proportional decrease of the partial pressure of oxygen from that originally started with. It would be necessary to start accordingly with a helium oxygen mixture not greatly less strong in oxygen than 145 mm. partial pressure. 3370 cu. ft. of such a mixture at normal pressure would be necessary to support a man weighing 150 lbs. at the altitude of 10,000 ft. occupying these 4800 cu. ft. This is equivalent to 642 cu. ft. of oxygen at normal pressure, far more than is necessary, and useless extra volume.

The consumption of oxygen for a person engaged in heavy work will not exceed 40 cu. ft. per day, and for a sedentary person may be as low as 12 cu. ft. As 10% consumption of oxygen per day may be allowed in a voyage it would be wise in this case to have not over two-fifths of the buoyant space filled with respirable mixture, the remainder being filled with pure helium.

Ventilation resolves itself into removing the expired carbon dioxide and adjusting the enclosed volume. This is most easily accomplished by a procedure similar to that used in the manufacture of carbon dioxide. The vitiated atmosphere within the ship is brought in contact with a spray of a solution of sodium carbonate at room temperature. Such a solution at this temperature has a vapor pressure as regards carbon dioxide which is low, and it will consequently absorb considerable carbon dioxide from a gaseous mixture if the partial pressure of the latter in the gaseous mixture is appreciable. It will also adjust the humidity of the gaseous mixture to proper amounts. The soda solution is then boiled by the exhaust from the motors. Carbon dioxide is thus boiled off and expelled. The hot exhausted solution, and the water vapor and carbon dioxide are put into separate circulation systems for heating and cooking purposes, and if necessary may be cooled by a radiator system cooled by the outside atmosphere. The carbon dioxide may be expelled from the ship after the water vapor is condensed out of it, or it may serve other purposes.

In certain cases a simpler procedure may be desirable. We may, for example, have but one spray chamber to which is supplied a solution of lime water, the lime water thereafter passing through a filter to remove the precipitated calcium carbonate and being again passed through a sludge of slaked lime. Owing to the greater alkalinity of lime water, a smaller spray chamber would be required and in general the apparatus would be much simpler and lighter. Operation of this type of an absorber means progressive loss in volume without changing weight with consequent decrease in buoyancy, which will often be desirable.

In the process of body oxidation, for the average diet about nine-tenths of the volume of oxygen consumed by a person reappears as carbon dioxide. Assuming 20 cu. ft. average consumption of oxygen per diem, this would result in some 18 cu. ft. of carbon dioxide per person. A little over 2 lbs. of carbon dioxide would be produced per diem on an average, and for this it would be necessary to carry about 2½ lbs. of unslaked lime, the water in the process being used over and over. Circumstances would dictate which of the two methods, or whether other more efficient methods for the absorption of carbon dioxide, would be used in a given case.

The extent to which balloons may be caused to rise is ordinarily adjusted by valving off lifting gas, or by dropping ballast. Another method is possible which has the advantage that it is reversible in action. Suppose that we are carrying in liquid or solid form a body of gas which has the property of easy liquefaction or solidification, and have at hand an apparatus by which we can easily convert the gas from the solid or liquid form to the gaseous and vice versa. As we convert the gas to a gaseous form from the more condensed state, we must distend a gas holder with it outside of the main body of the aerostat. In this way we secure increased volume with the same weight and in this way increase total buoyancy. And by liquefying or solidifying such a gas we abstract volume without change in weight. This process is equally efficacious whatever the density of the gas.

Carbon dioxide, while it has certain advantages as regards easy availability, has some disadvantages, particularly as regards the high pressure necessary to liquefy. It has the important advantage of solidifying easily, and when in this condition may be preserved without heavy vessels to contain it. The gas evaporation from the solid material will perform all the refrigeration necessary on board, and will serve to cool the compressed gas to liquefaction.

I am aware that it has been proposed to use ammonia gas in a somewhat similar manner. That is, it has been proposed to carry a supply of ammonia gas in a separate ballonet and to dissolve any desired amount in the water ballast to decrease lift. While ammonia gas has the advantage of being somewhat lighter than air, its weight is after all 17/29 that of air and its lifting value is, therefore, small. It requires twice its weight of water for solution. The total weight of the system will, therefore, be considerably greater than that of an equivalent volume of carbon dioxide. Ammonia is highly irritating if respired even in small percentages, which carbon dioxide is not. Finally, such a system is not easily reversible. That is, we cannot easily obtain dry ammonia gas from the solution of it in water while carbon dioxide can be varied from the gaseous state to the solid and vice versa with great ease. And it is to be remembered that in passing from the solid to the gaseous state it has just as much effect in increasing the absolute buoyancy of the structure as it would if it were hydrogen, as this is a question of change of volume without change in weight.

The gaseous carbon dioxide can be used in trimming the ship with as great ease as if water is used and can, if necessary, be as rapidly vented. An adequate supply can again be obtained from the motor exhaust gases of the motors, as above described. Finally, the power used in solidifying the carbon dioxide can be largely recovered in its expansion, if desirable.

A structure involving the use of the buoyant space for purposes other than buoyancy naturally contemplates a rigid aerostat, differences in volume of the buoyant gas being attained by variation in the volume of one or more ballonets placed within the space. These will ordinarily be filled with air and communicate with the outside atmosphere. A rigid wall can be made far more gas-tight than can any flexible one, and in particular lends itself to a procedure later to be described to obviate the loss of helium to a very large extent.

A further use of carbon dioxide is possible. If we have the wall confining the buoyant atmosphere double, the space between being cellular such as would be obtained, for example, by interposing a very loosely woven fabric between two approximately gas-tight surfaces, and if we then supply to this intermediate space carbon dioxide at a somewhat greater pressure than that reigning within the buoyant space, such leakage as occurs will be inward, considering the inner gas-tight partition only, and the passage of helium outward will be largely or wholly prevented, even if considerable leakage occurs. This space can be supplied from the carbon dioxide existing within one of the ballasting ballonets, and under these conditions the buoyancy of the structure, except for passage of carbon dioxide through the outer envelope, will not be affected and the carbon dioxide can be removed from the buoyant atmosphere just as that resulting from respiration is removed, and at the same time.

An important advantage of such a wall is its low heat conductivity. The heat conductivity of a given cellular structure is a function of the heat conductivity of the gas filling the spaces, and the heat conductivity of carbon dioxide is less than that of any common gas and only about one-twentieth that of helium. A cellular wall filled with this gas will accordingly insulate the ship to a very marked degree.

There are several methods of filling which can be used. The best is probably the use of carbon dioxide as a displacing means. Owing to its high density and low diffusion, carbon dioxide, if introduced to the bottom of a container, will largely displace the air in the container without mixing with it. If the air in the space is allowed to vent at the top it can nearly all be removed before the percentage of carbon dioxide in the issuing gas becomes large. At this point, if desired, the carbon dioxide can be recovered from the issuing gas as above described, and returned to the circulation and in this way the air can be removed to any desired degree. When this has been accomplished the desired helium oxygen atmosphere will be let in at the top of the space, the carbon dioxide being removed at the bottom and liquefied, the unliquefiable fraction being returned to the top of the space. When the percentage of carbon dioxide has dropped to a small amount it will be necessary to remove it by absorption, as elsewhere described.

As nitrogen will tend slowly to diffuse into the space a repurification system will be desirable, and for this absorption with charcoal will be suitable, this charcoal being cooled by the solid carbon dioxide or the cold gas therefrom during absorption and heated by the exhaust during the pumping off. Helium will not be appreciably absorbed, but both oxygen and nitrogen will be. If this process is carried out in the hangar by external apparatus it will be desirable to liquefy and fractionate the absorbed gas as it will be mostly oxygen, and if the ship is large enough an apparatus on board of this character may be used, such an apparatus being available for the replenishing of the oxygen supply from the outside air. It should be noted, however, that the charcoal absorption apparatus may be used directly as a fractionatory device under suitable control of temperature and pressure, nitrogen being less easily absorbed and more easily released in such manner, that the first gas given off on pumping is more predominantly nitrogen than the last.

Oxygen, if necessary, may be added from a compressed supply. In general, however, this should be unnecessary. It is more convenient to carry the oxygen at atmospheric pressure and mixed with the helium. The small adjustment in volume can be easily taken care of by the ballonet above mentioned within the space.

It will, in general, be wise to have gas-tight partitions in the ship, similar in function to watertight bulkheads. Entrance and exit may be through gas-locks of conventional design.

The structural system may be of the Zeppelin or external rib type, or it may be internal, and more like that existing in steel buildings. This should be advantageous in order to supply and support the decks which would be required to carry the larger number of passengers.

This method may also be applied to aerial vehicles of the airplane type in which the volume of wings and fuselage is made very large in proportion to the area of wing surface, as will always be the case as the size of airplanes is increased. There comes a time in this increase when the weight of air within the plane comes to have a relatively large proportion to that of the structure. At, or before this time, however, the weight of the structure comes to have an unduly large proportion to the possible wing area. It then becomes desirable to apply this invention to this type of vessel. Insofar as the effective weight can be lessened in this way, it will become possible to decrease the starting and landing speed, the angle of plane attack and of descent, and consequently the air resistance and power necessary to operate at a given speed. It may also be possible to lighten the specific weight of the plane to such an extent as to limit the speed of free fall to a speed not dangerous to plane or those therein.

It is to be understood that the methods outlined herein as to the operation of aerial vehicles are practicable through the use of various types of apparatus, and the drawings herewith are to be understood as general and diagrammatic.

In these drawings in which like numerals refer to like parts throughout the several views, Figure 1 is a diagrammatic representation of a rigid airship showing the method of controlling the buoyancy of the airship and the pressure within the aerostat without loss of fluid material.

Fig. 2 is a diagrammatic representation more or less in the way of a flow sheet of the apparatus for carrying out the method of using carbon dioxide or other condensible gas in order to control the buoyancy of the airship according to the method in Fig. 1 and hereinafter described with reference thereto.

Fig. 3 is a diagrammatic representation of the means outlined for preventing leakage of a buoyant gas from a closed space.

Fig. 4 is a diagrammatic representation, more or less in the way of a flow sheet, of a method for purifying the oxygen helium mixture within the aerostat from an absorbable gas such as carbon dioxide, as shown in Fig. 3 and hereinafter described with reference thereto.

Fig. 5 is a diagrammatic representation of an airship moored to a mooring mast showing a method of carrying out passage of men and materials into and out of the inhabited portion of the buoyant space of the airship and showing a particular form of gas-lock suitable therefor.

Fig. 6 shows another form of gas-lock permitting direct passage to and from the interior of a body of buoyant gas without sensible loss of the buoyant mixture.

Fig. 7 is an enlarged detail of the type of wall shown in Fig. 3.

Referring to Fig. 1, which shows the principal spaces in an airship of the type described herein, 1 is the main aerostat of the ship filled with the above outlined buoyant mixture of oxygen and helium and used for machinery, freight, quarters for passengers and crew and all other useful purposes, none of these latter being shown. It is bounded by a gas-tight wall 3 which may be of the structure shown in Fig. 7 or of a more usual type. It may be variously placed and in practice will be divided by one or more gas-tight bulkheads, omitted in the drawings for the sake of clearness. It may, if convenient, be divided into two or more non-contiguous sections, although in ordinary operation these will be in gaseous communication with one another, usually by passageways for passengers and crew.

There may or may not, depending on circumstances, be provided a space or spaces 2 filled with pure helium or other buoyant gas. There should be provided the spaces 4 shown here in the nose and tail of the ship in free communication with the outside air and more or less filled therewith. Each of these spaces, and in general each main subdivision of them, will be provided with a gas holder of variable volume, here shown as a ballonet, which in the case of the ballonets in space 4 will be filled with a condensible gas such as carbon dioxide, and, in the case of those in spaces 1 and 2, with air. The spaces 1, 2 and 4 have such ballonets 5, 6 and 7, respectively. The latter are shown in gaseous connection with a duct system 8, suitable control valves 11 being provided in the connection to each ballonet 7. One or more fans or pumps 12 may be supplied in the duct system. This system also connects with the condensing system shown in Fig. 2 and the heat insulated bins 13, this part of the system being more extensively diagrammed in Fig. 2.

The various parts of the apparatus diagrammatically shown in Fig. 1 operate as follows, controlling buoyancy of the airship as a whole:

For example, let it be assumed that the airship starts out at sea level and ascends to an altitude of 1000 feet. At the start the ballonets 5 and 6 will contain air, the ballonet 7 containing carbon dioxide. If the temperature is 20° C. and does not change during the ascent, the volume of the buoyant gas will increase 3.6%; if the volume of space 1 be assumed to be 3,000,000 cu. ft. the increase in volume of the gas in this space would be 108,000 cu. ft. This volume of air is accordingly vented from the ballonet 5 to the outside air, corresponding amounts being removed from the ballonets 6 depending on the volume of the space 2. It is now desired to decrease the buoyancy to stop the rise.

The apparatus shown in Fig. 2 is accordingly operated to convert more or less carbon dioxide from the gaseous to the solid state, gas being abstracted from the ballonets 7. In this way the volume of the structure is diminished while its weight remains unchanged. It accordingly is less buoyant. The process is strictly reversible without loss of material. Trimming from fore to aft is accomplished either by condensing more or less carbon dioxide to the solid form in the aft bin 13 as distinguished from the forward bin 13 or by shifting gas from one ballonet 7 to the other, rapid changes in trim being attained in this latter way.

Referring now to Fig. 2, there is shown a variable volume gas holder 7, representing the ballonets so designed in Fig. 1. This is in communication with the heat insulated gas-tight bin 13 by the duct 14 suitably provided with a valve 15. Into and out of the bin 13 lead two cyclic duct systems. The first leads out of the top of bin 13 and is provided with a valve 16; then follows the duct 17 to the source of heat 18, here shown as a heat exchanger, utilizing the heat of the motor exhaust; thence by duct 19, fan 20 and duct 21 back to the bottom of bin 13, delivering below the screen 22 horizontally placed therein. The second cyclic system consists of a duct 23 leading from the top of bin 13, passing to one-half of the heat exchanger 24, thence by duct 25 to the high pressure compressor 26, thence by high pressure piping 27 to the other half of the heat exchanger 28, thence by pipe 29 to the expansion valve 30, and thence back to bin 13.

Operation is as follows:

(a). To decrease buoyancy. The compressor 26 is operated, liquefying carbon dioxide which in liquid form passes through the expansion valve 30 whereby part is solidified falling as a snow on the screen 22. Filtering cloths, not shown, may be provided above this screen. The remaining cold gas passes back through the paths 23, 24, 25 to the compressor together with such additional gas from the holders 7 as is required to make up the original volume. The cold gas in its passage through the heat exchanger 24—28 cools the highly compressed gas from the compressor to a temperature where it will take the liquid state. In this way the volume of the gas holders 7 is contracted and the total buoyancy of the ship is lessened.

(b). To increase buoyancy. The compressor 26 being stopped and the fan 20 being started, gas is carried by duct 17 to heater 18, thence by path 19, 20 and 21 back to bin 13 where it vaporizes a certain amount of solid carbon dioxide, the volume being vaporized passing out to the gas holders 7. In this way the volume of the ship is increased without changing weight, with consequent increase in buoyancy.

The only practical disadvantage to this system is the pressure necessary to solidify the carbon dioxide. This can, if desired, be obviated by using some other heavy gas such as methylene dichloride in place of the carbon dioxide. This gas can be liquefied under relatively low pressure, but it is believed that the other advantages of carbon dioxide outweigh this disadvantage, particularly the fact that an inexhaustible supply of the latter may be obtained from the motor exhaust. This is particularly the case if the exhaust is supplied with a catalytic means of converting the carbon monoxide present to carbon dioxide such as has been suggested for motor cars.

Referring now to Fig. 3, there is shown the space 1 filled with helium and oxygen or other buoyant gas. This is provided with the double wall 3 consisting of an outer gas-tight wall 79ª, inner wall 79 and intermediate gas space 77. A possible construction is shown more in detail in Fig. 7.

The space 1 is provided with an absorption system more particularly shown in Fig. 4, though even there the figure is diagrammatic. Through this system circulates the atmosphere filling the space 1. In passing therethrough the carbon dioxide is absorbed, the buoyant gas passing in at 32 and out at 33. The carbon dioxide is regenerated, and passes out as a relatively pure gas at 34 into the conducting system 35. A duct 36 may supply any necessary additional carbon dioxide from the holder 7, or the bins 13. The conducting system is connected with the space 77 preferably at numerous points, the pressure in space 77 being kept slightly above that reigning in space 1 which is at the pressure of the external atmosphere. Some leakage will presumably occur in the direction of the short arrows, that is, inward towards the space 1 and outward towards the atmosphere. Such leakage as occurs inward, if supplied from the gas holders 7 without that space, will not change the buoyancy or total volume. The leakage outward will result in smaller total volume but the loss will be of a gas heavier than air, so that a slight increase in buoyancy will take place. Adjustment thereto may easily be made by the methods shown above.

Fig. 4 shows the carbon dioxide absorption system shown as part of Fig. 3 but in more detail. It is of a usual type except for modification in the direction of using very little absorbing liquid. For this reason both absorption and regeneration of the carbon dioxide is by apparatus of the spray type. The absorber is shown at 38 and consists of a closed chamber in the bottom of which are a plurality of spray jets. The atmosphere in space 1 is circulated through the chamber 38 by the fan 40 entering by the duct 32 and leaving by the duct 33. The spray nozzles are supplied by a solution of an alkaline carbonate or other efficient absorption liquid, this liquid circulating cyclicly along the path 39, 38, 42, 43, 44, 45, 46, 47, 48. That is, it is forced by the pump 48 through pipes 49 to the spray nozzles 39 into the chamber 38. From here it passes to the pump 42, the heat exchanger 43ª, the heater 43, the pipes 44 leading to the spray nozzle 45 in the bottom of the regenerating chamber 46. Here the hot spray evaporates in part, both carbon dioxide and water vapor being driven off. The exhausted solution passes then by the return pipe 47 to the pump 48 to continue the cycle. The carbon dioxide and water vapor evolved in the chamber 46 pass by the duct 80 to the condenser 50 where the water vapor is condensed. The water passes back to the cyclic system by the pipe 41. The carbon dioxide passes from the condenser 50 to the duct 34 and thence to the conducting system 35 shown in Fig. 3.

Fig. 5 shows a convenient method of docking such an airship. While shown as docking at a mooring mast, the same method is used when the ship is in a hangar. The mooring mast is shown provided with a gas-tight chamber or well 51 extending from a gas-tight chamber 52 located at the ground level. At the top of the chamber 51 is a vertically rotatable dome 53. This is shown as resting on the annular float 54 floating in the annular mercury trough 55 hermetically secured to the top of the chamber 51. However, any other gas-tight means of affording free vertical rotation of the dome 53 could be used. In the hangar this motion would, of course, be unnecessary. Mechanical means within the dome 53 will be provided to take care of the stresses on it when an airship is moored thereto. One side of the dome 53 is provided with a gas-tight door diagrammatically shown by the dotted line 56. Connection with the nose of the airship in which is the gas-tight door 57 is made by the flexible, tubular gas-tight structure 81 which may be in the form of an accordion bellows. There may be provided mooring cables in addition. Entrance to the space 52 may be by various types of gas-lock. In addition to the type shown in Fig. 6, vacuum locks may be used for freight. A convenient lock for both men and materials is one containing carbon dioxide and lying below the level of the floor of the space 52. This is shown at 58 and 59 as a simple passageway, consisting of a descending and ascending flight of stairs closed in the center by a vertical door 60 not necessarily completely gastight, and at the entrance and exits by horizontal slides 61 and 62. Passage through a lock of this kind will result in a very little contamination of the carbon dioxide in the side 58 by the air, very little loss of the carbon dioxide in the side 59 into the space 58 or the space 52, and almost no final loss of the helium oxygen mixture. Such admixture as occurs may be taken care of by the two absorption systems 63 and 64 similar to that pictured in Fig. 4. The purified carbon dioxide will be delivered to the bottom of the spaces 58 and 59 and the impure carbon dioxide will be taken from near the top of these spaces, the admixed air in one case being rejected and the admixed helium and oxygen in the other being returned to the space 52.

Fig. 6 shows in plan a type of lock valuable because, with considerable simplicity of means, small loss of valuable gas will occur in operation. It consists of a chamber 65 of any convenient shape provided with gas-tight doors 66 and 67 to the exterior and closed space, respectively. Valves 68 and 69 similarly communicate to the exterior and to the closed space, respectively. Attached to the two other vertical walls 70 by their peripheries are the two pieces of thin, flexible and elastic rubber 71, and back of the attachments are the ports 72 communicating with the pressure system 73 by the three-way valve 74.

Operation is as follows:

The door 67 being closed and the rubber in the relaxed position shown in dotted line, the door 66 is opened and an object 76, say a person, is placed therein. The door 66 is closed, the valve 68 is opened, and the three-way valve 74 turned so that gas under pressure is introduced back of the flexible rubber 71 which now assumes the position 75 closely enveloping the object 76. If a person be in the lock he may breathe through a tube, not shown, or with a Mommsen lung. The valve 68 is now closed, valve 69 opened, and valve 74 turned to the venting position. The rubber 71, accordingly, returns to the relaxed position shown in dotted line. The door 67 can now be opened and the object 76 pass into the closed space. In order to pass an object in the reverse direction the same method will be used, the cycle of operations being reversed.

Fig. 7 shows a possible type of wall provided with a central gas space such as is contemplated in the device outlined in Fig. 3 and described with reference thereto. A central coarse, loosely woven fabric 77 has applied to it on each side the fine rubberized fabric 78 such as balloon cloth, which may have applied to its outer side the coating of rubber 79, the whole structure being vulcanized together.

It will thus be seen that I have provided a method of operation for airships which has the following advantages over previous practice:

In the first place, it is now possible, by following the teachings of this invention, to increase greatly the useful load of an airship lighter than air in proportion to the weight and cost of the structure, in comparison with the proportion of useful load to total structure found possible hitherto. This increase will make the use of an airship so constructed and operated economically possible in competition with other types of rapid transportation. In addition, as I have shown, this method is applicable to the construction of very large airplanes where the weight of the displaced air comes to bear a large proportion to the weight of the structure, and removes the theoretical upper limit to the size of such airplanes.

I have shown also a method of controlling the buoyancy of an airship which involves no loss of material, making more possible long voyages and numerous changes of level without landing, and making control of buoyancy when liquid fuels are used far more easy.

I have shown a method of filling airships provided with aerostats with rigid walls which is rapid, economical of gas, and positive.

I have shown a method of controlling pressure in such a rigid aerostat with coincident control of buoyancy, involving no loss of material.

I have also shown a method of preventing leakage from an aerostat to a very large extent.

I have further shown methods of docking a locking into and out of an airship containing buoyant respirable gas.

All these methods, while forming part of the general method outlined herein, may be used separately or in combination, as will be apparent to those skilled in the art to which this invention appertains.

Furthermore, it is to be understood that these methods and the combinations thereof, forming the particular procedure set forth, are presented for purposes of explanation and illustration, various modifications of the procedure being possible without departing from my invention as defined in the appended claims.

What I claim is:

1. In the operation of an aerial vehicle, the method of operation which consists in closing hermetically the space designed for crew and passengers, machinery or other load, and filling the space with a gaseous mixture consisting substantially of oxygen and helium, the oxygen being present in sufficient amounts to support respiration.

2. In the operation of an aerial vehicle, the method of operation which consists in closing hermetically the space designed for crew and passengers, machinery or other load, and filling the space with a gaseous mixture consisting substantially of oxygen and helium, the oxygen being present in sufficient amounts to support respiration, and absorbing the carbon dioxide resulting from respiration and removing it from the space.

3. In the operation of an aerial vehicle, the method of operation which consists in closing hermetically the space designed for crew and passengers, machinery or other load, and filling the space with a gaseous mixture consisting substantially of oxygen and helium, the oxygen being present in sufficient amount to support respiration, and absorbing the carbon dioxide resulting from respiration and removing it from the space by absorption in a liquid and subsequently boiling this liquid in order to free it from the absorbed carbon dioxide and regenerate it for further use.

4. In the operation of an aerial vehicle, the method of operation which consists in closing hermetically the space designed for crew and passengers, machinery or other load, and filling the space with a gaseous mixture consisting substantially of oxygen and helium, the oxygen being present in sufficient amounts to support respiration, and absorbing the carbon dioxide resulting from respiration by absorption in a solution of an alkaline carbonate and removing it from the space.

5. In the operation of an aerial vehicle, the method of operation which consists in closing hermetically the space designed for crew and passengers, machinery or other load, and filling the space with a gaseous mixture consisting substantially of oxygen and helium, the oxygen being present in sufficient amounts to support respiration, absorbing the carbon dioxide resulting from respiration and removing it from the space by absorption in an alkaline solution of a carbonate, and boiling the solution subsequently in order to free it from the absorbed carbon dioxide.

6. The method of controlling the buoyancy of an aerial vehicle which consists in changing the air displacement of the vehicle without changing its weight by providing a body of gaseous carbon dioxide held in a gas holder outside the main aerostat of the ship, and a body of carbon dioxide in the solid state contained within a heat insulated holder, and providing means whereby the gaseous carbon dioxide may be transformed to the solid state, and vice versa.

7. The method of controlling the buoyancy of an aerial vehicle by varying the volume of the vehicle which is displaced by air without varying the weight thereof, which consists in increasing the buoyancy by changing a body of carbon dioxide from the solid state to the gaseous state and decreasing the buoyancy by varying the carbon dioxide from the gaseous to the solid state.

8. The method of holding a buoyant gas within a confined space which consists in surrounding said buoyant gas with a wall consisting of two relatively gas-tight partitions separated by a gaseous space, leading a condensible gas into the space between two relatively gas-tight partitions surrounding the main space at pressures slightly above that reigning within the confined space, so that such leakage as occurs will be of the condensible gas and inward into the space, and purifying the buoyant gas of the condensible gas.

9. The method of holding a buoyant gas within a confined space in an aerial vehicle which consists in surrounding said buoyant gas with a wall consisting of two relatively gas-tight partitions separated by a cellular space, leading carbon dioxide gas into the space between the two relatively gas-tight walls at pressures slightly above that reigning within the confined space so that such leakage as occurs will be of carbon dioxide and inward into the space, and purifying the buoyant gas of the carbon dioxide.

10. The method of holding a buoyant gas within a confined space in an aerial vehicle which consists in surrounding said buoyant gas with a wall consisting of two relatively gas-tight partitions separated by a cellular space, leading a condensible gas into the cellular structure at pressures slightly above that reigning within the confined space so that such leakage as occurs will be of the condensible gas and inward into the space, and purifying the buoyant gas of the condensible gas, the condensible gas within the cellular space being caused to flow to and from a purifying apparatus.

11. The method of holding a buoyant gas within a confined space in an aerial vehicle, which consists in surrounding said buoyant gas with a wall consisting of two relatively gas-tight partitions separated by a cellular space, leading a condensible gas into the cellular structure at pressures slightly above that reigning within the confined space so that such leakage as occurs will be of the condensible gas and inward into the space, and purifying the buoyant gas of the condensible gas, such gas comprising carbon dioxide.

12. The method of locking into and out of a confined space containing a buoyant gas, which consists in providing a space below the level of the space containing the buoyant gas, the space at the lower level being filled with a relatively heavy gas such as carbon dioxide, the space at the lower level being provided with entry from the air and from the space containing the buoyant gas.

13. The method of holding a buoyant gas within the confined space which consists in surrounding said buoyant gas with a wall consisting of two relatively gas-tight partitions separated by a cellular space, leading a condensible gas into the cellular structure at pressures slightly above that reigning within the confined space so that such leakage as occurs will be of the condensible gas and inward into the space, and purifying the buoyant gas of the condensible gas, such gas comprising carbon dioxide.

14. The method of filling an aerostat having relatively rigid walls with a buoyant gas which consists in leading into the bottom of the space an easily condensible gas, removing the condensible fraction of the issuing gas, re-gasifying this fraction and returning it to the circulation, and discarding the noncondensible portion, until air has been substantially eliminated from the space, then leading buoyant gas into the top of the space, removing the condensible fraction from the gas issued at the bottom, returning the uncondensible fraction to the circulation until the condensible gas is substantially removed from the space and the buoyant gas alone remains in the space.

15. The method of filling an aerostat having relatively rigid walls with a buoyant gas which consists in leading in the bottom of the space an easily condensible gas, removing the condensible fraction of the issuing gas, and discarding the non-condensible portion until air has been substantially eliminated from the space, then leading buoyant gas into the top of the space, removing the condensible fraction from the gas issuing at the bottom, returning the uncondensible fraction to the circulation until the condensible gas is substantially removed from the mixture and the buoyant gas alone remains in the space.

16. The method of filling an aerostat having relatively rigid walls with a buoyant gas which consists in leading in the bottom of the space an easily condensible gas, removing the condensible fraction of the issuing gas, regasifying this fraction and returning it to the circulation, and discarding the non-condensible portion until air has been substantially eliminated from the space, then leading buoyant gas into the top of the space, removing the condensible fraction from the gas issuing at the bottom, returning the uncondensible fraction to the circulation until the condensible gas is substantially removed from the mixture and the buoyant gas alone remains in the space, such condensible gas comprising carbon dioxide.

17. The method of filling an aerostat having relatively rigid walls with a buoyant gas which consists in leading in the bottom of the space an easily condensible gas, removing the condensible fraction of the issuing gas, and discarding the non-condensible portion until air has been substantially eliminated from the space, then leading buoyant gas into the top of the space, removing the condensible fraction from the gas issuing at the bottom, returning the uncondensible fraction to the circulation until the condensible gas is substantially removed from the mixture and the buoyant gas alone remains in the space, such condensible gas comprising carbon dioxide.

18. The method of controlling the buoyancy of an aerial vehicle which consists in changing the air displacement of the vehicle without changing its weight by providing on said aerial vehicle a chemical body partly in the form of a condensible gas, and partly in a denser state, controlling the buoyancy of such aerial vehicle by abstracting heat from said chemical body in its gaseous state until condensation of a portion of said chemical body in the gaseous state occurs or evaporating a portion of said chemical body from said denser state to the gaseous state by imparting heat thereto, in order to decrease or increase the buoyancy of said aerial vehicle.

STERNE MORSE.